Figure 1:
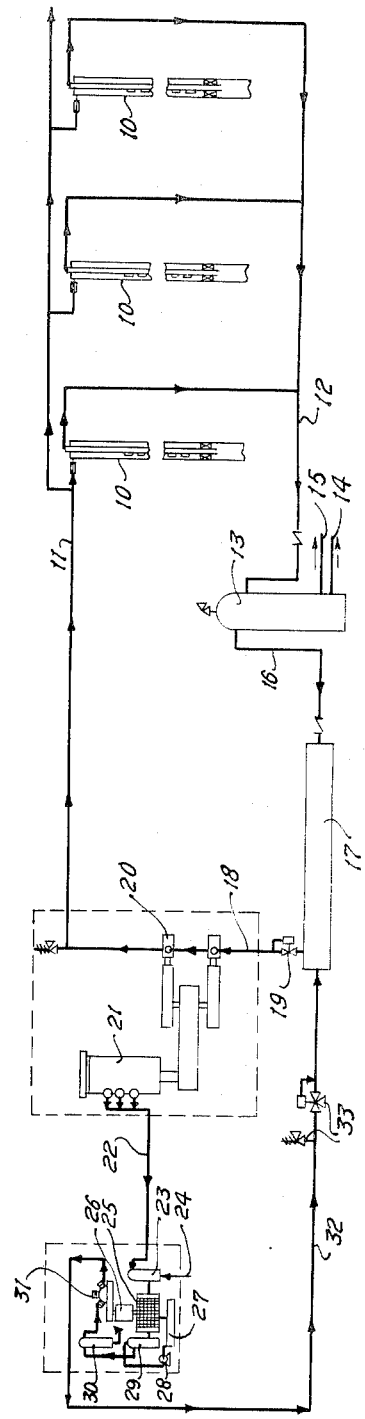

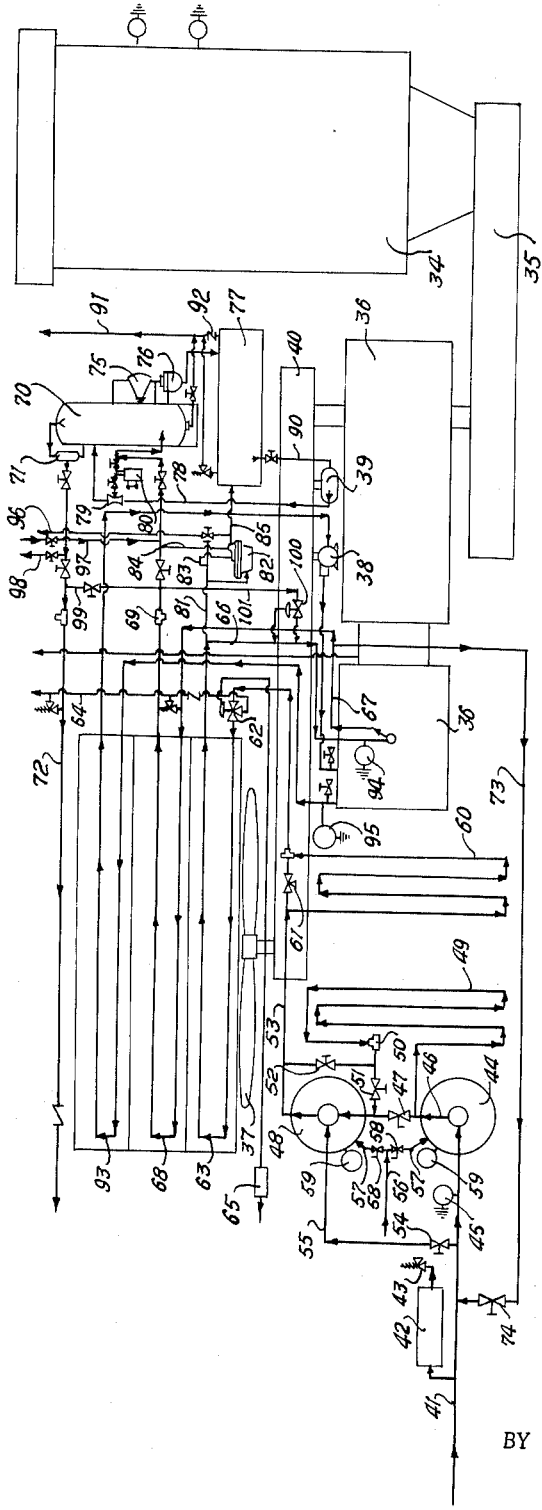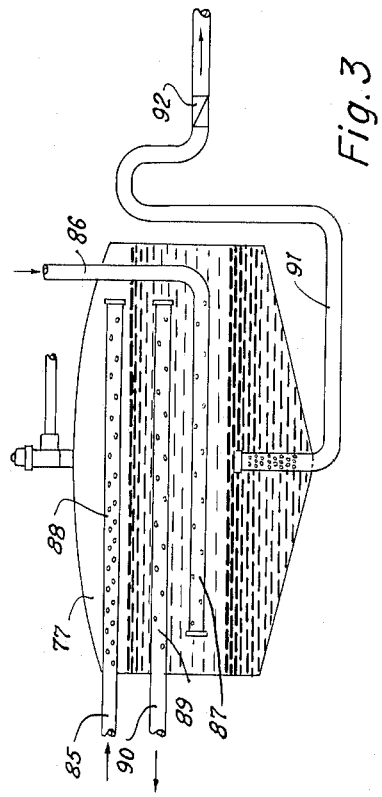

United States Patent Office 3,232,885
Patented Feb. 1, 1966

3,232,885
METHOD OF PRODUCING AN INERT GAS
Werner Henke, P.O. Box 1932, O.C.S., Lafayette, La.
Filed Oct. 7, 1963, Ser. No. 315,426
6 Claims. (Cl. 252—372)

This application is a continuation-in-part of my copending application Serial No. 176,479, filed February 19, 1962, now abandoned, which was a continuation-in-part of my earlier copending application Serial No. 73,334, filed December 2, 1960, now abandoned.

This invention relates to new and useful improvements in methods and means for producing inert gases.

The invention is particularly directed to methods and means for producing inert gases suitable for subsequent use under pressures of the order of magnitude of 500–1000 pounds per square inch.

There are many instances in industry, and particularly in the oil industry, in which it is desirable or necessary to have available a source of inert gas which may be compressed to relatively high pressures, and which is non-explosive, non-corrosive, non-soluble, non-emulsifying, and non-flammable. In many cases in the oil fields and in the petroleum industry, natural gas has been used for these purposes even though it does not possess all of the above properties, primarily for the reason that natural gas has on occasion been inexpensive and readily available. Now, however, in many locations, natural gas is not available in sufficient quantities or is too costly for many of the uses for which it was formerly employed, and an alternative supply of gas has become necessary.

Gas of this nature is used in gas lifting to produce petroleum wells, as replacement gas in existing gas lift systems, as a testing media for piping and pressure systems, for dilution of natural gas to bring its B.t.u. content to the desired level, for the gas drilling of wells, and for cycling or repressuring petroleum fields or pools. There are, of course, many other known uses of such a gas and the invention is not to be limited to any particular one thereof.

There have been prior attempts to utilize the flue gases of boilers, the exhaust gases of internal combustion engines, and various types of inert gas generators for the supplying of sufficient quantities of an auxiliary, and preferably inert, gas, but in each instance, the process has either been too expensive or has not produce a gas having all of the desired qualities, especially when the pressure of the gas is elevated considerably. In most of these attempts, the produced gas was too expensive for the intended uses, or contained explosive or corrosive components rendering its use dangerous or harmful, again, particularly under high pressures.

It is, therefore, a principal object of this invention to provide improved methods and means for producing quantities of a substantially inert gas either from the exhaust fumes of an existing internal combustion engine, or an internal combustion engine forming a part of the system.

An additional object of the invention is to provide improved methods and means of the character described in which water is recovered and removed from the engine exhaust gases and employed for treatment and purification of said gases so that the need for outside water supplies is eliminated, in addition to which there is provided a source of water free of dissolved or entrained oxygen or air.

A particular and important object of the invention is to provide improved methods and means of the character described in which ammonia in desired quantities may be generated as the inert gas is produced, such ammonia being absorbed in the water which is condensed and serving to protect the generating system against corrosion and functioning also to neutralize any acidic components which may be present; and further, in which the quantity of ammonia produced, and hence the pH of the condensed water, may readily and easily be controlled.

A still further object of the invention is to provide improved methods and means of the character described which are capable of treating internal combustion engine exhaust gases to produce an inert gas consisting essentially of nitrogen, or a gas consisting of nitrogen and a small percentage of carbon dioxide, and having provision for removal of excess oxygen, sulfur compounds, oxides of nitrogen, carbon monoxide, and such percentages of carbon dioxide as may be found desirable or necessary.

In many instances, the pressurizing of gas systems is obtained or maintained through use of compressors driven by internal combustion engines which employ natural gas or liquefied petroleum gases as a fuel. In both cases, increased volumes of water vapor are produced in the exhaust gases as compared to an engine utilizing diesel oil or gasoline as a fuel, and this, of course, is particularly true of engines utilizing natural gas which is predominantly methane. It is, therefore, a further object of the invention to provide improved methods and means of producing bodies of inert gases which are particularly and especially adapted for use in conjunction with the exhaust gases of internal combustion engines consuming natural gas as a fuel.

Yet another object of the invention is to provide improved methods and means of the character described wherein a fuel gas is utilized and in which provision is made for purifying the fuel gas before its use, as for instance for the removal of hydrogen sulfide or sulfur compounds while passing a main gas stream in series or in parallel, or through one or more, or two or more, catalytic reaction zones, or in the alternative, so passing the main gas stream and also passing it through a third treating zone for removal of additional components.

An additional object of the invention is to provide improved methods and means of the character described making provision for extracting water from internal combustion engine exhaust gases and continuously utilizing such water to form a treating solution which may be employed for treatment of the exhaust gases and continuously re-circulated with treating chemical addition and exhausted chemical removal to ensure full and complete utilization of the treating chemical and minimum consumption thereof.

A still further object of the invention is to provide improved methods and means of producing an inert gas which may be utilized under relatively high pressures without becoming corrosive or otherwise harmful to the equipment with which it comes in contact, and without reaching an explosive state.

A construction designed to carry out the invention will be hereinafter described, together with other features of the invention.

The invention will be more readily understood from a reading of the following specification and by reference to the accompanying drawings, wherein examples of the invention are shown, and wherein:

FIG. 1 is a diagrammatic view illustrating one system construction in accordance with this invention and adapted to carry out the methods thereof, this particular modification being illustrated in use in conjunction with a gas lift system, FIG. 2 is a diagrammatic view of a modified form of the system, and FIG. 3 is an enlarged schematic view of the treating solution storage tank.

In the drawings, the numeral 10 designates a group or series of gas lift wells to which lifting gas under pressure is supplied through a manifold 11. The lifted fluids are discharged from the wells into a manifold 12 which leads to an oil, water and gas separator 13. Although the outlet conductors of the individual wells may be connected separately into the separator 13 or may be connected to individual separators similar to the separator 13, they have been shown as manifolded into the separator for purposes of simplicity. Water is drawn off from the separator 13 through an outlet conductor 14, and separated oil is removed through a conductor 15. The residual gas at a pressure of possibly 50 to 100 pounds per square inch is taken through a conductor 16 into an accumulation or surge vessel 17 from which lifting gas is drawn, through a conductor 18 and regulator valve 19 to a two-stage compressor 20 driven by an internal combustion engine 21. The lifting gas flows under a pressure of the magnitude of 500–1000 pounds per square inch or more from the compressor into the manifold 11 for return to the wells and further lifting of fluids therefrom. In general, this type of gas lift system for producing fluids from wells is entirely conventional in nature and no claim is made thereto.

Ostensibly, a gas lift system of this type is a sealed system and includes a closed gas circuit, but in actual practice quantities of gas are more or less continuously lost from the system, and additional quantities of replacement or "make-up" gas must be added to the system substantially continuously. It is the supplying of this make-up gas in an economical fashion, as well as the supplying of an inert and completely harmless gas, that constitutes one use of the present invention. There are many other uses of such a gas.

In the form of the invention shown in FIG. 1, the combustion gases are exhausted from the internal combustion engine 21 through a conductor 22 leading to a vessel or container 23 having therein a suitable catalyst of any of the several well-known types for converting the exhaust gases or fumes to nitrogen, carbon dioxide, and water or water vapor. Normally, catalysts of this type operate at quite elevated temperatures and the water will be present as vapor or steam.

The exhaust gases from an internal combustion engine, especially an engine utilizing natural gas or liquefied petroleum gas as a fuel, will contain greater or lesser quantities of the following components:

Water, $H_2O$
Carbon dioxide, $CO_2$
Nitrogen, $N_2$
Oxygen, $O_2$
Carbon monoxide, $CO$
Hydrogen, $H_2$
Oxides of sulfur, $SO_2$, $SO_3$
Oxides of nitrogen, $NO$, $NO_2$, etc.
Aldehydes, $HCHO$, etc.
Organic acids, $HCOOH$, etc.
Alcohols, $CH_3OH$, etc.
Hydrocarbons, $C_nH_m$
Smoke The conventional catalytic materials employed in the vessel 23 do not enter into any of the reactions involved but function to catalyze constantly at elevated temperature reactions converting the oxides of nitrogen to nitrogen gas and combining all of the oxygen present with the carbon and the hydrogen in the form of carbon dioxide and water, or substantially completing these reactions. Depending upon the oxygen present and the oxides present, it may be necessary or desirable to introduce additional carbon and hydrogen in the form of natural gas or methane which may be conducted into the catalytic vessel 23 through an inlet conductor 24, the natural gas being oxidized or burned in the presence of the catalyst because of the existent high temperatures. These reactions are predominantly exothermic and, once the vessel 23 has reached the proper operating temperature, are self sustaining.

The treated or partially treated gases are withdrawn from the vessel 23 and into an air cooled condenser 25 through which air currents or other cooling media may be passed by a fan or other means operated by an internal combustion engine 26. In the cooler or condenser 25, water vapor is condensed to water which collects in a pan or trough 27 and is forced by a pump 28 into a second treatment vessel 29. The gas exiting from the condenser 25 is also carried into the vessel 29.

This recovered water, having been condensed from the vapor phase, is relatively pure in nature and is free of dissolved or commingled oxygen or air, thereby substantially eliminating the corrosive qualities that it might otherwise have. A suitable chemical, such as sodium carbonate or ammonium hydroxide, or other suitable caustic or alkaline material, is fed into the pan 27 for commingling with the water, or may be introduced downstream of the pump 28 through a conventional aspirator. An alkaline or caustic solution is thus formed and introduced into the upper end of the vessel 29 for countercurrent flow with the exhaust gases to remove carbon dioxide therefrom. The additionally treated gases then pass from the vessel 29 to a third vessel 30 from which they are withdrawn by a compressor 31 driven by the engine 26 for delivery under pressure through a conductor 32 and suitable protective valving 33 into the surge or accumulation vessel 17. The vessel 30 may be a second catalytic treating chamber, or it may be simply a scrubber for removing any liquids which may be present to thus protect the compressor against the entry of liquids thereinto.

Quite obviously, several of the vessels 23 may be employed, depending upon the nature of the engine exhaust gas, to ensure the complete conversion of the exhaust gas components to the desired compounds, and several of the vessels 29 may be employed. Further, a diethanolamine contacting vessel may be employed for the removal of sulfur compounds, and the hot gas flowing from the vessel 23 may be employed for supplying heat to the reboiler or kettle of such a diethanolamine absorption component.

It is quite apparent that depending upon the composition of the engine exhaust gases, the number of catalytic steps the gas is taken through, and the number of absorption steps, outlet gas consisting essentially of nitrogen may be produced, the water having been removed by condensation and the carbon dioxide by absorption. Such a gas is not explosive, is non-corrosive, non-soluble, non-emulsifying, and non-flammable, and is readily compressed for injection into the wells 10 as an adjunct to the volumes of gas flowing in the gas lift system, or ultimately, as a complete replacement for such gas. Also, quite apparently, such a total gas supply or a supplementary gas supply may be employed for many other purposes, such as the gas drilling of wells, cycling or repressuring, or gas injection of petroleum fields or water wells, and for any of the other manifold uses to which a supply of inert gas under pressure may be applied. It is to be noted that the engine 26 may be omitted and the engine 21 employed for driving the compressor 31 in addition to the compressor 20, along with other elements of the gas generating system which require motive power, or in the alternative, that the exhaust gas from the engine 26 may also be utilized in the generating system in addition to the exhaust gas from the engine 21.

The recovery of water from the exhaust gases is very important in that the need for outside sources of water supply is thus avoided, in addition to which a quite superior supply of water is made available in that the water condensed from the water vapor in the exhaust gases is relatively pure and is free of dissolved gases which might otherwise be harmful to the system from a reactive viewpoint, or more importantly, from a corrosion viewpoint.

A modified form of the invention is illustrated in FIG. 2 in which there is shown in greater detail the various elements and components of the system, this second modification being subject to somewhat greater variation and latitude in modes of operation as compared to the first form of the invention. The second form includes an internal combustion engine 34 which may be an already existent engine driving a gas compressor or other equipment and which through a driving connection 35 drives a compressor 36, while driving a cooling fan 37, a cooling water pump 38, and a treating solution pump 39 through a driving connection 40 connected to the drive shaft of the compressor 36. Exhaust gases or fumes from the engine 34, as well as any other engines from which exhaust gases may be available, enter the system through a conductor 41 having connected thereto a surge and volume chamber 42 which may be a conventional engine muffler and which functions to smooth out pulsations or pressure variations in the incoming gas. A relief valve 43 is connected to the chamber 42 for maintaining the desired back pressure on the gas entering the system.

The conductor 41 leads to a first catalytic reactor or reactor vessel 44 containing a suitable conventional catalyst, which may be of the same type contained in the reactor 23, for partially or fully converting the exhaust gases to nitrogen, carbon dioxide and water vapor or steam. A suitable low pressure shut-down device 45 is connected into the conductor 41 and functions in the usual manner for stopping the engine 34 when the suction or inlet presure of the exhaust gas falls below a predetermined level, as, for instance, a level that might be harmful to the engine 34 or might tend to cause the drawing of air into the system through the valve 43. Treated or partially treated exhaust gases pass from the reactor 44 through a conductor 46 and a metering valve 47 into a second catalytic reactor or reactor vessel 48, or in the alternative, is passed partially or fully through a cooling coil 49, from which it is returned through a strainer 50 and a valve 51 into the vessel 48, or through a by-pass conductor and valve 52 into the outlet conductor 53 through which treated exhaust gases are withdrawn from the vessel 48. In some instances, it may be desirable to employ the vessels 44 and 48 in parallel flow, and for this purpose, a valve 54 and conductor 55 lead from the conductor 41 directly to the vessel 48, in which case the same type of catalyst would be employed in the vessels 44 and 48 and the parallel flow utilized for handling larger volumes of gas.

In other instances, and depending upon the nature of the exhaust gases being treated, the reactor 44 may contain one type of catalyst for partial conversion of the exhaust gases into the desired constituents, the reactor 48 containing a different type of catalyst for completing the treating operation. Some of these commercially available catalysts operate at quite high temperatures, and in such case, the reactor 44 may be employed not only for partial conversion of the exhaust gas, but also for elevating the gas to a relatively high temperature due to the exothermic reactions involved so as to provide a high temperature feed for the reactor 48, such high inlet temperatures sometimes being required for proper functioning of the second catalyst. In this case, the cooling coils 49 may be employed only partially or bypassed entirely in order to maintain the desired operating temperatures in the vessel 48.

Here again, a supply of fuel gas, usually natural gas, may be provided (usually initially) for the reactors 44 and 48 for conversion of all of the oxygen present either to carbon dioxide or to water, and such fuel gas is supplied through an inlet conductor 56 leading through branch conductors 57 and metering valves 58 into the two catalytic reactor vessels. Pyrometers 59 permit ready observation of the operating temperatures within the reactors.

A cooling coil 60 is connected to the outlet conductor 53 across a metering valve 61 by means of which the proportion of gas flow through the coil 60 may be regulated, it being noted that both the coils 49 and 60 are positioned so as to be in the path of the air currents created by the fan 37 and to be cooled thereby.

The treated gas is next conducted to a three-way valve 62 by means of which the gas may be directed into a precooling coil 63 cooled by the fan 37, or exhausted to atmosphere through a vent line 64. The valve 62 is controlled by a manual-reset, vacuum-responsive governor 65 which responds to the manifold vacuum of the engine 34 to shift the valve 62 and direct the treated gas through the coil 63. Thus, if the engine 34 stops for any reason, the governor 65 will shift the valve 62 to vent the exhaust gases through the outlet conductor 64, and must be manually reset before actuating the valve 62 to direct the treated gas through the precooling coil 63.

The treated gas passes from the precooling coil 63 through a conductor 66 to the intake of the compressor 36 and is therein compressed to the desired pressure level. The compressed gases flow from the compressor through a conductor 67 to an after-cooling coil 68, also cooled by the fan 37, and then through a strainer 69 into a washing or scrubbing vessel 70. Within the vessel 70, the cooled and compressed gas is subjected to scrubbing by an alkaline solution, such as a solution of sodium carbonate, ammonium hydroxide, and the like, as will be described more fully hereinafter, and then passed through a small trap or separator 71 into an outlet conductor 72 leading to the point of use of the pressurized, inert gas.

As pointed out hereinbefore, a fuel gas such as natural gas may be directed into either or both of the reactors 44 and 48 in accordance with the oxygen content of the incoming exhaust gases and for the purpose of burning the excess oxygen to water and carbon dioxide. Low operating temperatures indicated by the pyrometers 59 will give notice of the necessity of supplying additional quantities of fuel gas for burning the excess oxygen. On the other hand, low readings of the pyrometers 59 may indicate a relatively cool body of inlet exhaust gases. In addition, when large percentages of oxygen are present in the exhaust gases, the reactors 44 and 48 may reach excessive operating temperatures, and for this purpose, a bypass conductor 73 is connected through a valve 74 from the discharge side of the compressor 36 and the inlet conductor 41. With this provision, treated inert gas may be directed into the incoming exhaust gases for diluting the same and reducing the percentage oxygen content thereof to levels resulting in proper operating temperatures of the reactors 44 and 48. Thus, low temperatures of the reactors may indicate excess oxygen, but when sufficient fuel gas is added for burning and combining this excess oxygen into carbon dioxide and water, the reactors may reach undesirably high operating temperatures, in which event, the conductor 73 is employed for diluting the exhaust gases and reducing the over-all oxygen percentage thereof. In this manner, higher percentages of oxygen and oxides of nitrogen may be handled.

In initiating the exothermic reaction in the catalytic chambers or reactors 44 and/or 48, it is usually necessary to inject a fuel gas such as natural gas into either or both reactors. The natural gas, which may be considered essentially methane, combines with any oxygen present to form carbon dioxide and water. It has been found that when oxides of nitrogen are present, and they usually are, the addition of an excess of methane results in the formation of ammonia which not only disposes of the oxides of nitrogen, which are corrosive, but also alkalinizes the system through the condenser section and provides not only an absorbent for acidic gases but also actively protects the system from corrosion. Thus, the formed ammonia will be readily absorbed substantially completely in the water condensed from the water vapors which are present in the exhaust gases and are formed in the reactor, and an alkaline aqueous solution having a pH in the range of 8+ to 10+. Indeed, the pH of the condensed water may be increased or decreased by increasing or decreasing the supply of natural gas to the reactor and thereby increasing or decreasing the formation of ammonia.

The temperature rise in the reaction zone is theoretically some 235° F. to 250° F. for each percent by volume of oxygen present in the feed stream and some 250° F. for each percent by volume of oxides of nitrogen.

Assuming an inlet feed at 680° F. with an oxygen and/or oxide of nitrogen content of 4% by volume, a temperature in the reaction zone of some 2200° A. is obtained. When the gases leave the condenser at some 560° A. to 580° A. or 100° F. to 120° F. there will have been a volume reduction due to temperature drop and water condensation of approximately 4 to 1. This apparently enhances the formation of ammonia. The quantity of ammonia formed appears to be in almost direct proportion to the amount of natural gas introduced into the reactor or reactors.

It is well known that the oxides of nitrogen when cooled and pressurized in the presence of water vapor form nitric acid which is highly corrosive to ferrous metals, whereas aqueous ammonia apparently actually protects ferrous metal. For these reasons, the forming of the ammonia not only removes a harmful component, but also protects the system.

In some instances, there may be little or no oxides of nitrogen apparently present, yet the ammonia is still formed, seemingly by direct reaction between the nitrogen and hydrogen present, the latter being made available from the breaking down of the methane or the water. Accordingly, the system is protected against other acidic gases which may be present and a reactant therefor provided. It is believed that the large volume reduction in the treated gases is probably responsible for this direct formation of ammonia.

The scrubber vessel 70 is provided with a safety device 75 for stopping the engine 34 upon the occurrence of a high liquid level within the vessel 70, and also with a conventional automatic drain valve 76 through which the scrubbing liquid drains to a storage or accumulation vessel 77. Treating or scrubbing liquid passes from the vessel 77 through the solution pump 39 which delivers the treating liquid through a conductor 78 and aspirator 79 to the upper portion of the vessel 70 for further treatment of gas passing therethrough. As the solution passes through the aspirator 79, it draws additional quantities of treating chemical from a chemical make-up tank 80 through conventional aspirating action.

There will be quantities of water or water vapor in the gases leaving the reactors 44 and 48, and after cooling in the coils 63, this ammonia-containing water will be in the liquid phase so that it may be drained from the coil 63 through a conductor 81 to a conventional, vacuum-lift, condensate trap 82 having a pressure balance line 83 leading to it from the conductor 81 as well as a pressurizing conductor 84 supplying gas under pressure from the outlet of the cooling coil 68. The condensed water is thus forced from the trap 82 through an outlet conductor 85 into the vessel 77.

The vessel 77 is shown in greater detail in FIG. 3. The drain conductor 86 leading from the discharge valve 76 of the scrubber 70 terminates in a perforated manifold 87 disposed in the intermediate portion of the vessel 77 and extending transversely thereacross. The water condensate conductor 85 is connected to a perforated length of pipe 88 extending across the upper portion of the vessel 77, and a perforated discharge pipe 89 is disposed within the vessel between the perforated pipes 87 and 88. The perforated conductor 89 is connected to the outlet pipe 90 leading to the solution pump 39. There is also a discharge or spent solution drain conductor 91 leading from the lower portion of the vessel 77 through a check valve 92 and to a suitable point of spent solution disposal.

The treating solution utilized in the scrubber 70 does not necessarily become exhausted or spent upon a single passage through the scrubber, but as quantities of the solution become exhausted by absorbing constituents of the gas being treated as well as reaction products, the spent solution will become denser and will tend to settle to the lower portion of the vessel 77 for discharge through the outlet conductor 91. Fresh ammonia-containing condensed water is more or less constantly being introduced into the vessel 77 through the conductor 85, while treating solution containing greater or lesser quantities of spent material or components is being returned through the conductor 86. The conductor 89, being disposed in an intermediate portion of the vessel 77, permits the constant withdrawal of treating solution which is not yet exhausted so that the vessel 77 becomes not only a storage vessel, but also a vessel for the separation of classification of spent treating solution from unspent treating solution so that the solution may be constantly recirculated until it is exhausted. Additional quantities of treating chemicals are constantly being added through the aspirator 79 in order to maintain the vessel 70 at proper operating efficiency.

An additional cooling coil 93 may be positioned for cooling by the fan 37, and water or other cooling material constantly circulated by the pump 38 through the cooling jacket of the compressor 37 and then to the coil 93 for dissipation of its heat content. In this connection, a low pressure safety switch 94 may be provided in the compressor suction line 66 for stopping the engine 34 upon the ocurrence of an excessively low inlet pressure to the compressor, and a high temperature limit switch 95 may be employed in the cooling water outlet line from the cooling jacket of the compressor 36 for stopping the engine 34 in the event the outlet cooling water temperature reaches too high a level. Further, should excessive quantities of condensed water tend to accumulate in the system, or should it be desired to divert a quantity of this condensate for other uses, the water may be vented or discharged through the outlet conductor 96 leading from the conductor 85.

There are also occasions in which the fuel gas being supplied to the reactors 44 and 48 must undergo a preliminary treatment as, for instance, when such fuel gas contains hydrogen sulfide or other objectionable components. In this case, the fuel gas may be introduced through the conductor 97 and directed through the scrubber 70 into the outlet conductor 98, the treated inert gas then being taken directly from the outlet of the after-cooling coil 68 through the conductor 99 to the outlet conductor 72. The scrubbed fuel gas is, of course, conveyed from the outlet conductor 98 to the inlet conductor 56.

There may additionally occur certain operating conditions in which the pressure on the suction side of the compressor 36 is lower than desired, and in this event, a throttling valve 100, responsive to the low pressure in the conductor 66, opens to admit treated gas through the conductor 101 connected to the outlet of the after-cooling coil 68. The latter gas, of course, is under a pressure equal to that of the discharge pressure of the compressor 36 and serves not only to supplement the gas supply to the compressor but to increase the inlet pressure thereof.

Of course, various conventional fittings such as strainers, temperature wells, pressure gauges, check valves, and the like, may be incorporated throughout the system in usual and conventional fashions.

The operation of the system is believed clear from the foregoing description, it being noted that when the engine 34 is first started, the exhaust gases are vented through the conductor 64 until such time that the reactors 44 and 48 reach proper operating temperatures. The governor 65 is then manually set causing the three-way valve 62 to shift the gas flow into the precooling coil 63 and initiate the production of inert gas under pressure which is non-corrosive, non-flammable, and in all respects most suitable for utilization in various types of pressurizing systems. The system constantly furnishes its own make-up water for utilization in the scrubber 70, whether the scrubber is processing the exhaust gases or the fuel gas required for the reactors 44 and 48, and the treating solution is constantly replenished through the aspirator 79 from the supply vessel or tank 80. The system offers wide flexibility of operation for the processing of various types of exhaust gases and in varying quantities since the reactors 44 and 48 may be operated in parallel with the same type of catalyst, or may be operated in series with differing types of catalysts. Of course, differing chemicals may be employed in the scrubber 70 in accordance with the particular gas constituent found necessary to be removed. The initial cooling coils 49 and 60 may, of course, be utilized selectively as described.

The catalysts employed in the reactors 23, 44 and 48, and in the vessel 30 if a catalyst is employed therein, may be of any of several types, a number of which are presently commercially available, and additional ones of which are constantly being developed. These catalysts are of such a nature as to convert the oxides of nitrogen to nitrogen gas, to eliminate excess oxygen, and conceivably in some cases to reduce the oxides of sulfur or carbon. They may also be instrumental in the converting of minor constituents of the exhaust gases to the desired effluent gases, namely nitrogen, carbon dioxide and water vapor. There are platinum-alumina catalysts, platinum based catalysts and ferric oxide-chromium promoted catalysts presently available which are suitable for these purposes. Other catalysts are iron chromite, catalytic alumina and catalytic platinum. In most instances the introduction of a hydrocarbon fuel gas is essential to the initiation reduction step, natural gas having been found most suitable for this purpose. In the case of its non-availability or limited availability, gases such as propane and butane may be employed.

Elimination of one or more constituents in the scrubbing vessel 70 may be desirable either with respect to the exhaust gases being processed therein, or with respect to the fuel gas supplied to the reaction vessels. In the case of the fuel gas, it will usually be the purpose to remove sulfur compounds such as sulfur dioxide, hydrogen sulfide, or mercaptans, and in the case of the treated exhaust gases it will normally be the intent to remove oxides of carbon, and possibly oxides of sulfur. In each case, the usual and well-known treating chemicals will be employed for removal of the undesired compounds or materials.

It may also be desirable under certain circumstances to treat the fuel gas for the engine 21, the engine 26, or the engine 34 prior to the introduction of the fuel gas into the engines to remove sulfur compounds or other undesirable constituents. Such treatment may be indicated to remove the harmful components as early in the system as possible, both for the purposes of effectiveness of removal as well as protection of the system from the combustion products of such harmful components.

As noted hereinabove there have been previous attempts to produce useable and safe inert gases from engine exhausts, flue gases and the like, but the previous systems have failed to provide inert gases useable under relatively high pressures without excessive corrosion or danger of explosion. In particular, the prior systems have failed to take care of the problems arising through the presence in the exhaust gas of oxides of nitrogen which, under high pressures, become very harmful and corrosive. The usual and average concentration of oxides of nitrogen in the exhaust gases of internal combustion engines is 2500 parts per million, but to illustrate the importance of removing these oxides, it may be assumed that only 300–800 parts per million is nitrogen dioxide. This small amount of approximately 0.03 percent by volume is difficult to detect at low or atmospheric pressures and may appear insufficient to cause difficulties. When this nitrogen dioxide is reacted, however, with the water or water vapor that is produced in one million cubic feet per day of exhaust gas, there would also be generated 45 pounds of nitric acid. Obviously, such a corrosive acid in such quantities would be very harmful to the process equipment. Similar effects of corrosion occur when small amounts of oxygen are reacted in the presence of water and iron.

The prior systems also failed to remove oxygen, and in many instances, actually introduced additional oxygen which, in a closed rotative system of the types herein involved, causes an accumulation of oxygen with the resultant corrosion and danger of explosion.

It is sometimes necessary to initiate the reactions in the catalyst chambers through the introduction of an excess of hydrocarbon fuel gas either through the engine or into the catalytic reactor. In general, however, except when operating conditions become abnormal, once the reaction is started no excess of fuel gas is required, or the amount necessary becomes stoichiometric. The exhaust gas from the engine or engines will reach the catalytic reactors at a temperature possibly of the magnitude of 400° F., and this is sufficient to initiate the reaction. No outside source of heat is necessary and once started, the reaction is self-sustaining and exothermic.

As a specific example for utilization of the system to produce inert gas for makeup gas in a gas lift system for petroleum wells wherein approximately 1,300,000 cubic feet of gas per day is utilized in a rotative gas lifting system producing 6 wells, it is estimated that approximately 120,000 cubic feet of inert gas per day is required for makeup purposes. The gas lift system operating at approximately 850 pounds per square inch and exhausting at 100 pounds per square inch to a single stage compressor, the gas is compressed to approximately 420 pounds per square inch and delivered to the intake of a second single stage compressor wherein the gas is compressed from 420 pounds per square inch to 850 pounds per square inch for return to the gas lift wells. Since a 100 horsepower engine burning natural gas will produce something in excess of 300,000 cubic feet per day of engine exhaust gases, a suitable portion thereof at a pressure of 8 ounces per square inch absolute to ten ounces per square inch absolute and at a temperature of 1000° F. at the engine exhaust manifold were introduced into the catalytic chamber containing iron chromite as a catalyst, the chamber being approximately 5½ inches in diameter and about 40 inches long. The temperature of the exhaust gases entering the reaction chamber was approximately 680° F. and the discharge temperature was around 800° F., depending upon the amount of oxygen present. The reaction products were directed into an air cooled fin-tube, forced circulation group of cooling coils wherein the gases were cooled to within about 10° F. of ambient temperature. Therein, the water vapors condensed and were forced into a collecting vessel. The water is relatively pure in nature except for its ammonia content, is air free and had a pH of 8.3–10.2.

At this point, the system was still under a vacuum of less than ten inches of mercury, and the inert gas was conducted to the inlet of a small, 20-horsepower, 2-stage air cooled compressor having an inter stage pressure of 15–18 pounds per square inch and a discharge pressure of about 100 pounds per square inch. The temperature at the compressor discharge was approximately 270° F. but rapidly cooled through an air cooled pipe coil. From the cooling coils, the inert gas is introduced into the intake side of the main compressors.

The unit produced about 60 gallons of ammonia-containing water per day, the generator producing at the rate of about 83 cubic feet per minute of inert gases and with it a little over ⅓ pint of condensed water vapor. For carbon dioxide removal a 10–15 percent solution of sodium hydroxide may be introduced into the initial portion of the fin-tube condenser for recovery in the pan 27 and injection by the pump 28 into the entry point of the fin-tube condenser 25, or for injection into the vessel 29. In the form of the invention shown in FIG. 2, the sodium hydroxide solution receives ammonia-containing makeup water through the conductor 85, the treating solution being delivered through the pipe 90 and to the vessel 70 through the pump 39 and returning to the vessel 77 through the conductor 86. The carbon dioxide settles out in the form of sodium carbonate which settles to the bottom of vessel 77 and is withdrawn through conductor 91. A monoethanolamine water solution may similarly be utilized for removal of hydrogen sulfide either from the inert gases or from the incoming fuel gas being conducted to the engines or to the catalytic reaction chambers, there normally being no hydrogen sulfide remaining in the inert gas after it passes through the catalyst beds. This is less desirable, however, since heat is required for regeneration of the monoethanolamine solution, requiring the consumption of fuel gas, whereas the utilization of the sodium hydroxide process for removal of either or both carbon dioxide and hydrogen sulfide is self-sustaining and automatic.

Through the utilization of conventional chemicals in the scrubbing tower 70 and by the utilization of conventional water condensing and/or absorbing steps at the useable points in the system, an effluent inert gas consisting essentially of nitrogen may readily be produced with only a minimum of water content. It is also noted that the catalytic reaction takes place at subatmospheric pressures, and this is a critcial and important aspect of the invention. Thus, as noted in the specific example, the engine exhaust gases were introduced into the catalytic chamber at a pressure of 8–10 ounces per square inch absolute.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. The method of producing an inert gas suitable for subsequent use under pressures of the order of magnitude of at least 500 to 1,000 pounds per square inch including introducing a saturated hydrocarbon which is fluid at ambient temperatures into the exhaust gases from a hydrocarbon-fueled energy generator in quantities in excess of the stoichiometrical amount necessary to convert the exhaust gases to essentially nitrogen, carbon dioxide and water vapor, reacting the saturated hydrocarbon with the exhaust gases over a catalyst to form essentially nitrogen, carbon dioxide, water vapor and ammonia; sufficient of the saturated hydrocarbon being reacted with the exhaust gases to produce more than a mere trace of ammonia and to produce ammonia in amounts sufficient to inhibit the inert gas against corrosion of ferrous alloys; condensing the water vapor to water while absorbing the ammonia in the condensed water; withdrawing the condensate water; and discharging the treated and processed inert gas.

2. The method of producing an inert gas as set forth in claim 1 wherein the hydrocarbon-fueled energy generator is an internal combustion engine.

3. The method of producing an inert gas as set forth in claim 1 wherein the exhaust gas reacting step includes passing the exhaust gases first to a first catalytic reaction zone, and then passing the partially reacted exhaust gases to a second catalytic reaction zone.

4. The method of producing an inert gas as set forth in claim 1 wherein the exhaust gases reacting step includes passing the exhaust gases in split parallel flow to first and second catalytic reaction zones.

5. The method of producing an inert gas as set forth in claim 1 including the additional steps of compressing the discharged inert gas, and returning a portion of the compressed inert gas into the incoming exhaust gases to decrease the oxygen content thereof.

6. The method of producing an inert gas as set forth in claim 1 wherein the hydrocarbon is reacted with the exhaust gases over a catalyst at subatmospheric pressures.

References Cited by the Examiner

UNITED STATES PATENTS

| | | | |
|---|---|---|---|
| 984,605 | 2/1911 | Reichel et al. | 23—220 |
| 1,154,172 | 9/1915 | Brownlee et al. | 23—220 |
| 1,924,178 | 8/1933 | Bragg | 23—2 |
| 2,897,158 | 7/1959 | Sanzenbacher et al. | 252—372 |
| 3,000,707 | 9/1961 | Barstow | 23—281 |

MAURICE A. BRINDISI, *Primary Examiner.*